United States Patent
Aldrige et al.

(10) Patent No.: US 7,684,471 B2
(45) Date of Patent: Mar. 23, 2010

(54) RAKE-FINGER COMBINER WITH REDUCED RESOURCE REQUIREMENT

(75) Inventors: Christopher Anthony Aldrige, Singapore (SG); Ser Wah Oh, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 1205 days.

(21) Appl. No.: 10/407,840

(22) Filed: Apr. 3, 2003

(65) Prior Publication Data

US 2004/0013173 A1 Jan. 22, 2004

(30) Foreign Application Priority Data

Apr. 4, 2002 (SG) ............................ 200202020-4

(51) Int. Cl.
*H04B 1/00* (2006.01)
(52) U.S. Cl. ..................... 375/148; 375/147; 375/130; 370/335; 370/342
(58) Field of Classification Search ................. 375/148, 375/316, 349, 147, 130; 370/335, 342
See application file for complete search history.

(56) References Cited

U.S. PATENT DOCUMENTS 6,735,240 B1 * 5/2004 Kang ........................ 375/148

OTHER PUBLICATIONS

Lee S et al. "Time-deskew buffer design for MC-CDMA rake receiver", Electronics Letters, IEE Stevenage, GB, vol. 37, No. 14, Jul. 5, 2001, pp. 920-922.*

* cited by examiner

*Primary Examiner*—Mohammad H Ghayour
*Assistant Examiner*—Leila Malek
(74) *Attorney, Agent, or Firm*—David V. Carlson; Lisa K. Jorgenson

(57) ABSTRACT

An efficient architecture for a rake combiner is disclosed, for constructively combining the desired multi-path signals from a Code-Division Multiple-Access (CDMA) based system, such as a Third-Generation Partnership Project (3GPP) Frequency Division Duplex (FDD) mode Wideband CDMA (W-CDMA) system, or an IS-95 CDMA system. The described rake combiner employs a single M-stage tap-delay line, an N+1 input adder, an arrangement of index offsets, pass gates, comparators and an M-stage counter to perform the combination, where M represents the delay spread in terms of symbol duration and N represents the number of rake fingers to be combined. The rake combiner architecture facilitates lowered resource requirements through use of a single tap-delay line in contrast to a conventional rake combiner which uses a series of M-stage tap-delay lines and an N input adder to perform the combination.

15 Claims, 3 Drawing Sheets

RAKE-FINGER COMBINER WITH REDUCED RESOURCE REQUIREMENT

BACKGROUND OF THE INVENTION

1. Field of the Invention

This invention relates to a circuit and a method for processing received signals. One implementation of the invention is in a receiver system that combines a number of multi-path signal components delayed by differing amounts of time before reaching the receiver. Such a system is typically found in a code-division multiple-access (CDMA) demodulation system, or "rake receiver".

2. Description of the Related Art

Code-division multiple-access (CDMA) systems have been in existence for some time in military communications networks and the like, but have more recently gained popularity in more general telecommunications networks. For example, international standards specification IS-95 (Mobile Station—Base Station Compatibility Standard for Dual-Mode Wideband Spread Spectrum Cellular System. TIA/EIA-95) is based on a CDMA system, and public mobile telecommunications networks operating in accordance with IS-95 are now in operation in the USA, South Korea, Hong Kong, and a number of other countries.

The first-generation analogue based mobile telecommunication systems originally used a pair of dedicated radio channels with typically 30 kHz bandwidth to establish a connection between the base station (BS) and mobile station (MS). Second generation digital systems typically operate according to a time division multiple access (TDMA) regime, such as in the case of the Global System for Mobile Communication (GSM) and IS-136 systems. In a TDMA approach, each pair of dedicated radio channels is divided into a number of timeslots to enable communications between the base station and a plurality of mobile stations, with each mobile station being allocated a separate timeslot on the channel. With a CDMA system the radio channel bandwidth is typically larger than for an analogue system, for example 200 kHz channel bandwidth for GSM.

CDMA systems implement a form of spread spectrum communications, and employ a pair of radio channels with a much larger bandwidth, such as 1.5 MHz for IS-95 or 5.0 MHz for UTRA FDD (Universal mobile telecommunications system Terrestrial Radio Access—Frequency Division Duplex). The bandwidth of each CDMA channel can simultaneously convey multiple separate communications in a manner which is neither frequency divided nor time divided as in the case of the analogue systems and TDMA systems, respectively. Basically, each user is assigned a pseudo-noise (PN) random sequence (constructed from channelization codes and scrambling codes) which is used to modulate the information (e.g. symbols) to be conveyed onto the channel. If the receiver has knowledge of the PN code, it is able to distinguish one user from the others and recover the relevant information.

CDMA systems make use of a PN code that has a much higher bit rate than the symbol-rate of the information being transmuted. The bit-rate of the PN code is referred to as the chip rate. The chip rate is typically $2^n$ (3, 4, 8, 16, 32, . . . ) higher than the symbol rate. After modulation with the PN code, the resulting chip sequence is passed through a filter with a root-raised cosine frequency characteristic. The signals output from the filter are then presented to the radio frequency (RF) system for modulation onto a RF carrier.

In a wireless communication system, the signals transmitted from the base station (BS) usually travel across a certain distance before reaching the mobile station (MS). When passing through the air interface, apart from the direct path between the BS and MS, there may additionally be longer paths as a result of the signal being reflected by buildings, the ground and other large objects. Hence, at the MS it is not unusual to receive a number of signals, possibly having different received power levels and time delays. These replicas of signal are referred to as multi-path signals. The time difference between the first and last reaching the MS is generally referred to as the delay spread.

In a narrow-band wireless communication system, multi-path signals generally create extra interference. However, for wideband systems such as W-CDMA (Wideband Code Division Multiple Access), the use of advanced receiver designs can be used to resolve the multi-path signals and eliminate the negative effects of the interference. When the received signal is demodulated from the RF carrier back to a baseband signal, a further demodulation is necessary to remove the PN sequence before the original symbol information can be retrieved. A plurality of baseband demodulators (e.g. 4-6) can be employed with each one assigned to demodulating the PN sequence from the received baseband signal based on different transmission delays. These baseband demodulators are referred to as "rake fingers".

The final stage in the demodulation process (performed by a combiner) involves combining the outputs from each of the rake fingers constructively to arrive at the received symbol sequence. The use of a number of rake fingers to demodulate a number of signals received from the air-interface improves the decoding probability of the received sequence. Thus, the utilization of rake fingers and combiner not only overcomes the multi-path interference, it also serves to improve the quality of the de-spread signals.

As long as the delay spread is significantly smaller than the symbol period, the outputs from the rake fingers can be easily combined using a simple addition. However in the UTRA 3G FDD CDMA system, this is no longer the case. In that case, the chip rate employed is 3.84 Mbits/sec, and the symbol rate can range from 960 kbits/sec to 15 kbits/sec. Considering the higher symbol rate of 960 kbits/sec yields a duration of 1.04 μs. It is not unusual for a delay spread to be of the order of 10 μs.

BRIEF SUMMARY OF THE INVENTION

Embodiments of the present invention facilitate the combination of multi-path signals in a CDMA receiver such that relatively long delay spreads can be conveniently dealt with.

In accordance with an embodiment of the present invention, there is provided a combiner circuit for use with a spread-spectrum rake receiver having a plurality of rake receiver fingers providing de-spread symbol data from respective corresponding signal components of a received spread-spectrum multi-path signal. The combiner circuit includes a tap-delay line having a sequence of registers cyclically addressed according to a counter index. A summation circuit is included having inputs adapted to receive de-spread symbol data from a plurality of rake receiver fingers by way of gating circuitry controlled in accordance with correlation between the counter index and a respective predetermined de-skew index corresponding to each rake receiver finger. For each counter index the summation circuit is operative to sum the data contents of the addressed tap-delay line register with the de-spread symbol data from each rake receiver finger having a matching de-skew index, the summation result being stored in the addressed tap-delay line register.

In a preferred form of the invention, the number of registers in the tap-delay line sequence is equal to the delay spread of the received multi-path signal in terms of de-spread symbol durations.

The gating circuitry preferably includes, for each rake receiver finger, a de-skew index register stored with a de-skew index, a comparator for comparing said de-skew index and the counter index, and a pass gate controlled by the output of the comparator and having its input coupled to the output of the rake receiver finger and its output coupled to an input of the summation circuit.

The de-skew index corresponding to a particular rake receiver finger is preferably determined on the basis of the path delay of the signal component for that rake receiver finger.

In accordance with another embodiment of the present invention, there is also provided a rake receiver for spread-spectrum multi-path signals including:

a plurality of rake receiver fingers for generating de-spread symbol data from respective corresponding signal components of a received spread-spectrum multi-path signal; and a combiner including a sequence of registers cyclically addressed according to a counter index, and a correlator coupled to the rake receiver fingers and the register sequence for summing data from an addressed register in said sequence with selected de-spread symbol data from at least one of said rake receiver fingers in accordance with a predetermined correlation between said rake receiver fingers and said counter indices.

The correlator preferably includes an adder having inputs coupled to receive de-spread symbol data from the respective rake receiver fingers by way of gates controlled in accordance with correlation between the counter index and a respective predetermined de-skew index corresponding to each rake receiver finger.

In the preferred form of the invention, for each counter index the adder is operative to sum the data contents of the addressed register in the register sequence with the de-spread symbol data from each rake receiver finger having a de-skew index matching the counter index, with the summation result being stored in the addressed register.

The number of registers in the register sequence is, in the preferred form of the invention, determined by the delay spread of the received multi-path signal in terms of de-spread symbol durations.

Preferably, for each rake receiver finger, the gate includes a de-skew index register stored with a de-skew index, a comparator for comparing the de-skew index and the counter index, and a pass gate circuit controlled by the output of the comparator and having its input coupled to the output of the rake receiver finger and its output coupled to an input of the adder.

In the preferred embodiment, the de-skew index corresponding to a particular rake receiver finger is determined on the basis of the path delay of the signal component for that rake receiver finger.

There is further provided, in accordance with the invention, a method for combining de-spread symbol data generated by a plurality of rake receiver fingers from respective corresponding signal components of a received spread-spectrum multi-path signal, including:

establishing a sequence of registers;

determining a de-skew index for each rake receiver finger;

addressing the registers in the sequence according to a counter index cycle; and when the counter index matches the de-skew index for a particular rake receiver finger, summing de-spread symbol data from that rake receiver finger with the contents of the addressed register in the sequence and storing the summation result in the addressed register.

BRIEF DESCRIPTION OF THE DRAWINGS

The invention is described in greater detail hereinafter, by way of example only, with reference to embodiments thereof and the accompanying drawings, in which.

DETAILED DESCRIPTION OF THE INVENTION

In order to provide a thorough understanding of the present invention, its operation and advantages, the concept and operation of a standard CDMA receiver is first described hereinbelow by way of background.

Figure 1:
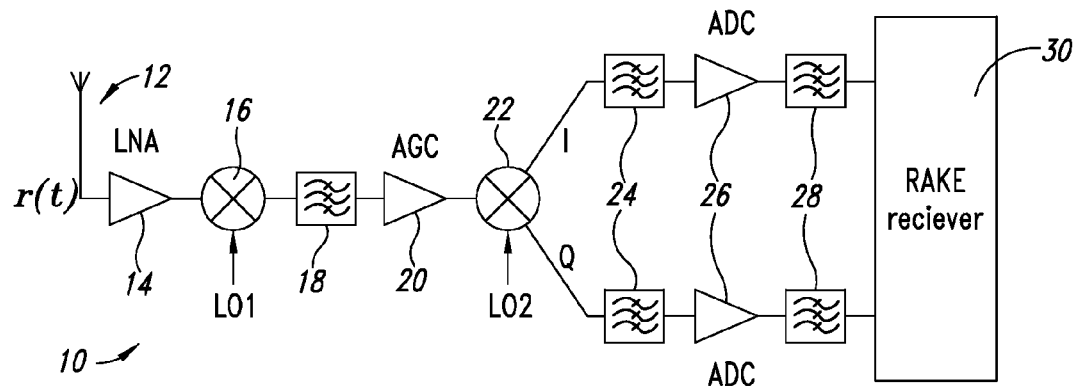
FIG. 1 is a block diagram of a conventional CDMA receiver including a rake receiver.

A conventional CDMA receiver circuit 10 is shown in block diagram form in FIG. 1, which obtains a received signal (r(t)) from an antenna 12. The antenna 12 is coupled to pass the received signal to a low-noise amplifier (LNA) 14, having its output coupled to an input of a first mixer circuit 16. The first mixer circuit 16 mixes the amplified received signal with a signal derived from a first local oscillator LO1, and the output is passed to a bandpass filter 18. The output of the bandpass filter 18 is coupled to the input of an automatic gain control (AGC) circuit 20, which in turn provides input to a second mixer circuit 22.

At the second mixer 22, the signal is down-converted to base-band by mixing with a second local oscillator signal (LO2) and split into in-phase (I) and quadrature (Q) components, which are respectively passed to lowpass filters 24. The outputs of filters 24 are coupled to respective analog-digital converters (ADCs) 26, which are in turn connected to respective finite impulse response (FIR) filters 28. The outputs derived from the FIR filters 28 are then provided to a rake receiver 30.

The received signal r(t) is first amplified by the low-noise amplifier (LNA) 14 and output to the first mixing stage 16. At the input of the first mixer 16, the received signal is analogue and is at the carrier frequency. This is down-mixed to a first intermediate frequency (IF) at the first mixer 16, and unwanted components are removed by the bandpass filter 18.

An Automatic Gain Control (AGC) stage 20 after the bandpass filter 18 is used to control the signal amplitude. In second and third generation communication systems, the control mechanism for the AGC is typically derived from the power measurement of the demodulated in-phase (I) and quadrature (Q) signals. These algorithms are normally performed by a baseband digital signal processor. The signal is then presented to a second mixer (complex) 22 that down-converts the signal to base-band and also splits it into its in-phase and quadrature components. Thus, the signal is orthogonalized.

The respective in-phase and quadrature lowpass filters 24 remove the unwanted components from the down-converted signal so that only the useful bandwidth of the received signal is retained. After the filtering, the base-band analogue received signal is digitized by the respective analogue-digital converters (ADCs) 26 before being filtered by respective FIR filters 28 programmed with a root-raised cosine (RRC) profile.

As mentioned, in third generation systems currently proposed, the chip-rate of the signal is 3.84 Mcps. As stated by Nyquist, the sampling rate must be at least twice the bandwidth of the signal. Typically, the ADC samples are at four times the chip rate and the output signal is 4-8 bits per sample. The purpose of the FIR filter is to band-limit the noise to the same bandwidth as that of the signal, and to give a raised cosine transfer function when the path from the transmitter to the receiver is considered.

After passing through the FIR filter, the digitized in-phase and quadrature components of the signal are available for despreading by a rake receiver. The rake receiver utilizes the concept of "time diversity" to combine signals that have been delayed due to various paths between the transmitter and the receiver. It has a number of correlators or "fingers", and each finger is used to despread one of the paths. Typical rake receiver designs use 4, 5 or 6 fingers to deal with signals that have multipath components. One such finger is shown in block diagram form in FIG. 2.

Figure 2:
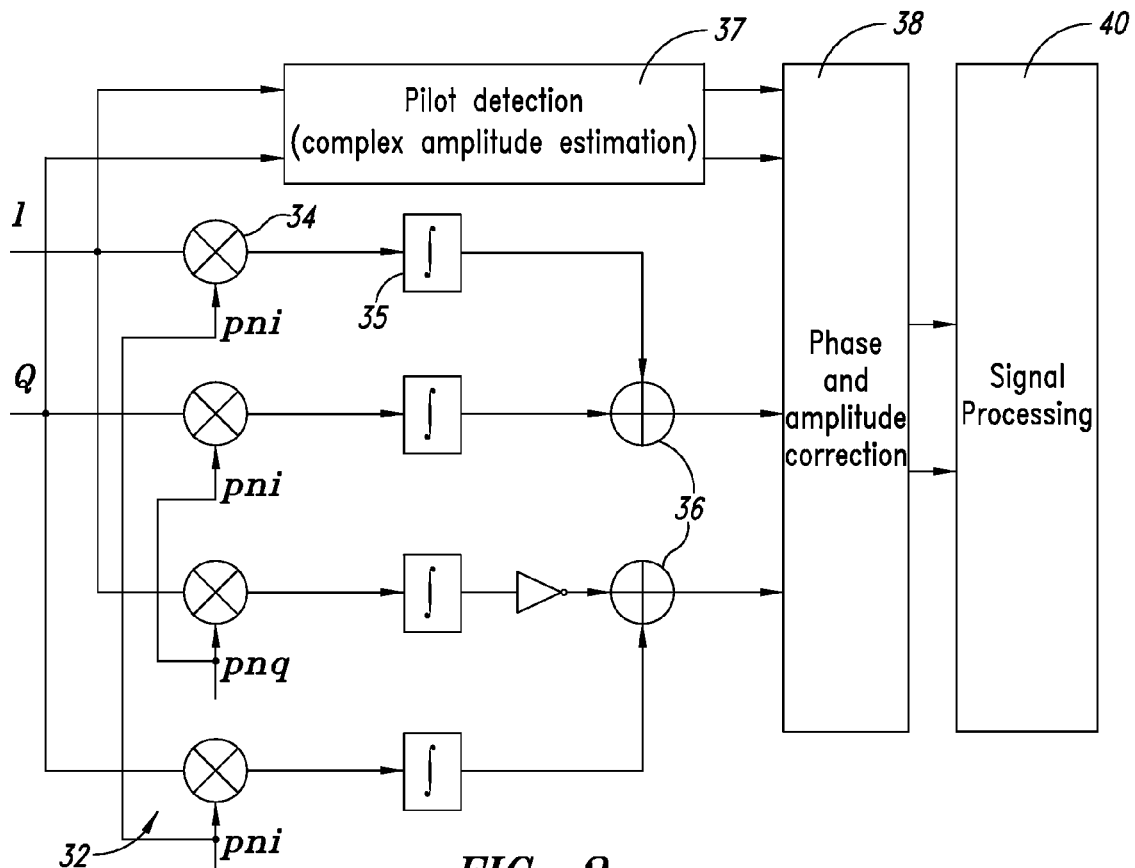
FIG. 2 is a block diagram of a correlator ("finger") of a conventional rake receiver.

FIG. 2 is a representation of a typical single finger 32 of a rake receiver. The digitized signal in the form of I and Q components must be correlated in order to achieve despreading so as to yield the desired information bits following signal processing. The I and Q signal components are multiplied (34) with an exact replica of the complex spreading code signal (PN, represented in complex form as pni and pnq) and correlation is performed via the integrator 35. The integrator 35 is reset at the end of each symbol period. The resulting correlation signals are summed (36) to form composite I and Q signal components. Since the received signal is impaired by fading and phase rotation, a pilot detector (complex amplitude estimation) 37 is required for coherent detection. The output from the pilot detector 37 is fed to the phase and amplitude correction block 38 to mitigate the phase and amplitude changes due to these effects. The I and Q signal components are then subjected to signal processing (40) to obtain the reconstructed information bits. Other rake fingers perform the same operation with different delays to achieve the despreading. The signal processing block (40) illustrated represents all of the processes that are involved following the correlation process required to reconstruct the originally transmitted data sequence. In the immediate context of the rake receiver, this would include a rake combiner and a channel-decoder for forward-error correction.

Figure 3:
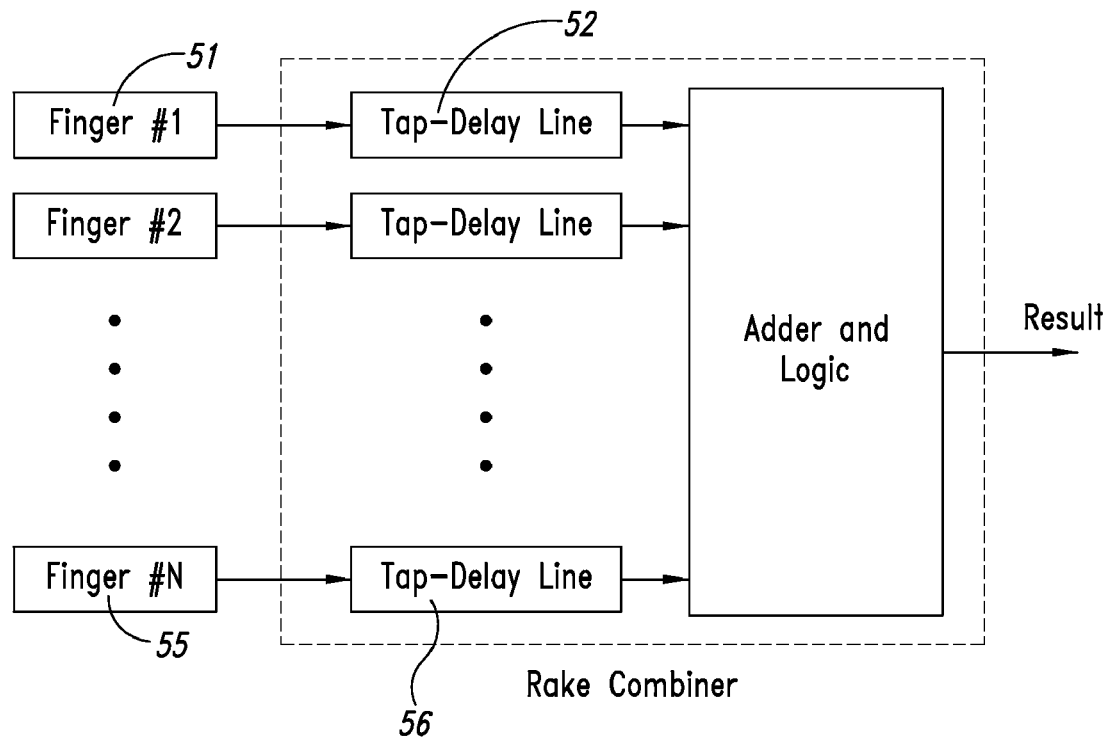
FIG. 3 is a block diagram of a conventional rake combiner circuit suitable for use in a CDMA receiver.

As mentioned, difficulties with correlation can occur in this form of receiver when the delay spread is greater than the symbol period of the transmitted information. The most common way to deal with this problem and still have multiple rake fingers is to have an M-tap tap-delay line for each rake finger. This structure is illustrated in block diagram form in FIG. 3 and described briefly below. For convenience, only one branch (I or Q) is shown in the block diagram of the combiner.

The conventional rake combiner requires an M-tap tap-delay line for each finger. Depending upon the time the rake finger is aligned to, the corresponding position in the tap-delay line is selected and then presented to the adder for combination. The tap-delay line needs to match the delay spread of the system in question. For example, if the first rake finger 51 is intended to receive the direct signal, the first tap of the corresponding tap-delay line 52 is input to the rake combiner. Another rake finger (e.g. 55), receiving the signal with the longest air-interface path, utilizes the last tap of the corresponding tap-delay line (56) for input to the rake combiner. Thus, if another rake finger is receiving the signal with an air-interface path somewhere in between the shortest and longest path, then an intermediate tap would be assigned.

For 3GPP ($3^{rd}$ Generation Partnership Project) ULTRA FDD mode W-CDMA, the design of the rake receiver should cope with a delay spread of, for example, 10-20 μs. Hence with a chip rate of 3.84 MHz and minimum spreading factor (SF) of 4, the length of tap-delay line should be 9-19 stages. Typically 4-6 fingers will be used, which necessitates 4-6 individual tap-delay lines and corresponding logic circuitry to select the taps.

The principles of the present invention enable reduction of the number of tap-delay lines to one whilst employing a similar amount of logic to perform a combination of signals originating from the different rake fingers.

Figure 4:
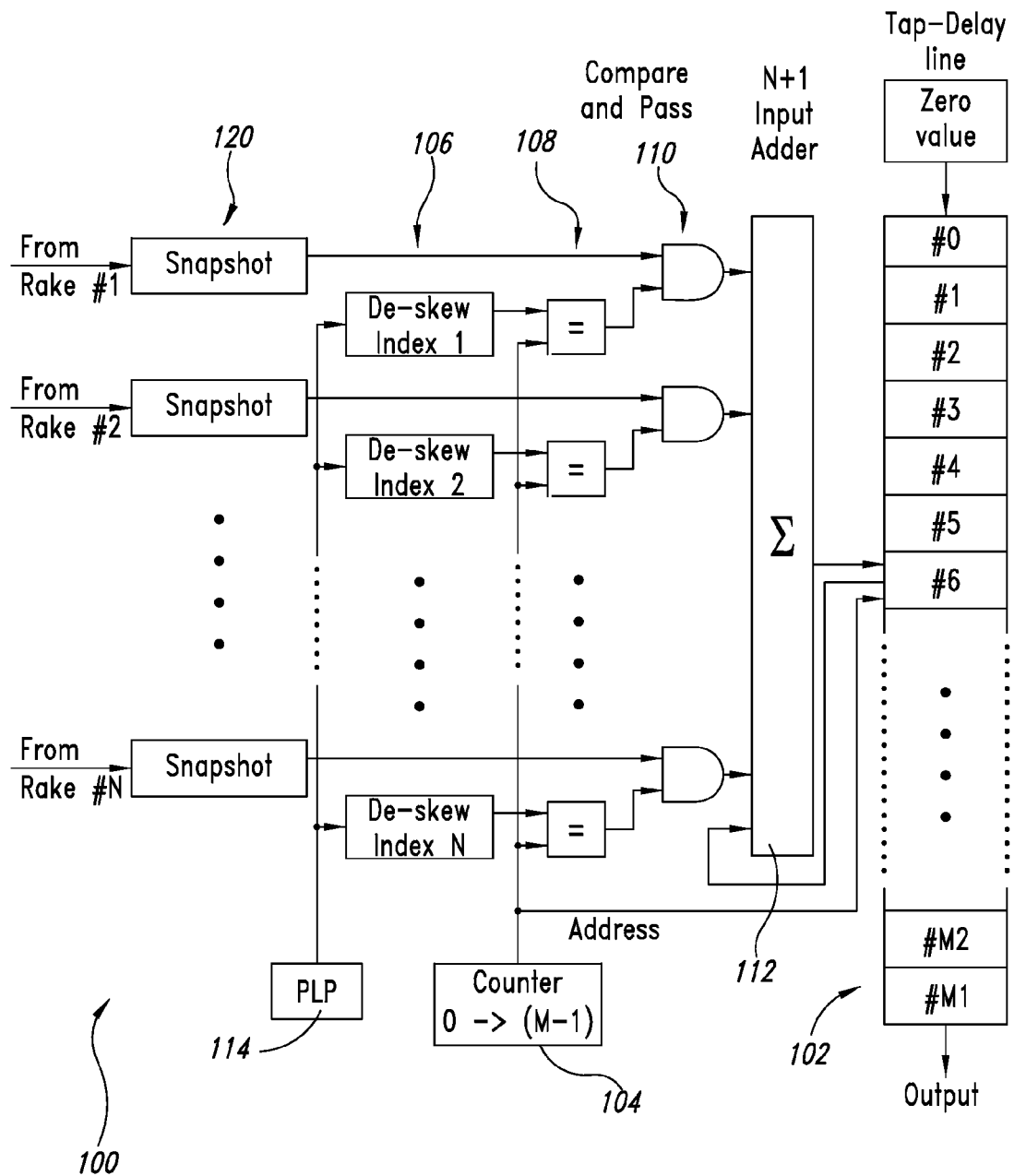
FIG. 4 is a block diagram of a rake combiner circuit constructed in accordance with an embodiment of the present invention.

A rake combiner 100 constructed in accordance with an embodiment of the present invention is shown in block diagram form in FIG. 4, and described hereinbelow. For convenience, only one branch (I or Q) is shown in the block diagram of the combiner. The rake combiner 100 primarily includes: a register sequence in the form of a single tap-delay line 102; a divide-by-M counter 104: and a correlator comprising N de-skew index registers 106, N comparators 108, N pass gates 110, and an N+1 input adder 112; where N corresponds to the number of rake fingers employed, and M is the delay spread in terms of symbol durations. In this description, it is assumed that there is also a Physical Layer Processor (PLP) 114 that is used to manage the rake receiver and its elements. The PLP may comprise, for example, a dedicated hardware block, programmable Digital Signal Processor (DSP) or Micro-Controller Unit (MCU).

The output from each of the N rake fingers is provided to a snapshot buffer register 120, which may hold, for example, output from the corresponding rake finger for one symbol duration. The output of the snapshot buffer is coupled to the corresponding pass gate 110, and each of the N pass gates have their output coupled to a respective input of the (N+1)-input adder 112. The output of the adder 112 is coupled to the tap-delay line, as described in greater detail below, and a connection is also provided from the tap-delay line back to the final $(N+1)^{th}$ input of the adder 112. Whilst the tap-delay line 102 utilizes a larger data width to accommodate for the N+1 inputs, the total resources required is still much less than a conventional rake combiner as described earlier.

The pass gates 110 are controlled by the outputs of respective comparators 108. The inputs to each comparator 108 are provided from a respective de-skew index register 106 and from the counter 104. The de-skew index for each rake finger is set by the PLP 114 according to the signal delay for that rake finger. The output of the counter 104 is also used to address the input of the tap-delay line 102 to which data from the adder 112 is written. Thus, the counter acts as a timing comparator for the rake fingers as well as an address pointer into the tap-delay line for the combining process.

The general operation of the rake combiner 100 is as follows. The time delay for the path to be processed by each rake ringer is converted into an index and programmed into the corresponding de-skew index register 106 by the PLP 114. For each rake finger, this involves determining the time delay for that finger, subtracting the minimum (direct path) delay, and quantizing the result based on divisions of (P/M) where P is the length of one symbol period.

The counter 104 is arranged to increment in steps of one from 0 to (M—1) in single symbol period P. The de-skew index 106 for each rake finger is compared with the output from the counter by the corresponding comparator 108. When the de-skew index for a particular finger is equal to the current counter value, the corresponding pass gate 110 allows the output from the snapshot buffer for that particular rake finger to be presented to the input to the adder 112.

The contents of the sequence of registers comprising the tap-delay line 102 are initialized to zero before processing begins. At the end of each symbol period cycle, data in the tap-delay line 102 is shifted "down" by one register location, whereby output data is shifted out from the last (#M−1) register location and a zero value is shifted into the first (#0) register location. The data shift in the tap-delay line is performed at the end of each cycle of M increments of the counter 104. The output of the counter 104 is also used to address the location of the register in the tap-delay line register sequence which is coupled for input to and output from the adder 112. For each increment of the counter 104 the adder is coupled to a correspondingly different one of the M register locations in the tap-delay line 102.

As mentioned, an output from the tap-delay line 102 is coupled to an input of the adder 112. Accordingly, for each value of the counter 104, one of the M registers in the tap-delay line sequence is addressed, and the existing content of the addressed register is provided as input to the adder 112. The data from the addressed tap-delay line location is summed with the data provided from any of the rake finger snapshot buffer(s) 120 for which the corresponding de-skew index is equal to the counter value. The results of the summation by the adder 112 are then written back into the location in the tap-delay line addressed by the counter, overwriting the previous contents thereof. It is possible that more than one rake finger snapshot may be combined for a given value of the counter.

At the end of each symbol period, i.e., when the counter has cycled through 0, 1, 2, 3 to M−1, the tap-delay line data is shifted down one location and the outputs from the rake fingers is provided to the corresponding snapshot buffers 120. The data from the (M−1)$^{th}$ location of the tap-delay line is then available for the next stage of processing in the CDMA receiver system, such as a channel decoder.

The above described rake combiner design has a latency of M symbols, which is of the same order as currently employed rake combiner designs. It will be recognized, therefore, that the first M outputs from the rake combiner 100 are discarded.

Regardless of the number of rake fingers in the receiver, only one tap-delay line is required for operation of the rake combiner of the preferred embodiment. Accordingly, this architecture saves the resource requirement for tap-delay lines by a factor of N, where N is the number of rake fingers, and can be easily upgraded to combine the outputs from any number of rake fingers.

The following description relates to a rake combiner according to the principles of the present invention based on the parameters of a 3GPP UTRA FDD W-CDMA system. However, it will be understood that this does not restrict the adoption of the invention in other rake receiver systems.

Before commencement of the combination of rake outputs, the PLP (114) calculates the de-skew index for each rake finger from the timing offset of the signal paths that each rake finger is assigned to de-spread, as given by $$\text{Deskew\_Index} = \left[\frac{\tau_c}{SF}\right],$$

where $\tau_c$ is the timing offset in chips with respect to a reference timing, [x] denotes the largest integer value equal to or less than x, and SF is the spreading factor.

In actual implementation, [$\tau_c$/SF] can be achieved by merely shifting $\tau_c$ by p positions to the right where p=log$_2$(SF). Without loss of generality, the reference timing can be taken to be the earliest (e.g. direct transmission) path for the purposes of this description.

Assuming a delay spread of 10 μs, the de-skew index can only take values ranging from 0 to 9 since the smallest SF is 4. Considering a clock rate of 30.72 MHz (8 times the chip rate), the PLP also sets the counter time increment as $$\Delta_{counter} = \frac{SF}{2} \text{ clock cycles}$$

After initialization, the counter (104) cycles repeatedly through 0 to 9, with the beginning of each cycle aligned with respect to the timing of the earliest path.

The initial values in the snapshot registers are set to 0 by default. When a comparison of the counter index is found to equal the de-skew index for a certain rake finger, the content of the corresponding rake finger snapshot register is summed with the content of the tap-delay line register addressed by the counter. The summation result is written back to the addressed location. At the end of the counter cycle period (i.e. counter=9) new snapshots are taken at the rake finger outputs and the tap-delay line is shifted down one position. This shift causes the results at the 9$^{th}$ position (before shift) of the tap-delay line to be output to the next stage of the receiver system, such as the channel decoder. At the same time, a zero value is shifted into the 0$^{th}$ position of the tap-delay line. The first 9 results are discarded since the rake combiner has a latency of 9 symbols. The same process is repeated for decoding other symbols in the rake receiver system.

A rake combiner scheme described herein enables utilization of a single tap-delay line regardless of the number of rake fingers employed in the receiver. The rake combines architecture has the advantage of simple implementation and low resource requirements, and it is flexible enough to support any suitable number of rake fingers as input. The foregoing detailed description of the preferred embodiment has been presented by way of example only, and is not intended to be considered limiting to the invention as defined in the accompanying claims. The essential features and operations of the rake combiner have been described in detail sufficient to enable those of ordinary skill in the art to implement the invention. In practice it may be found that the rake combiner circuits of an implementation of the invention are fabricated as part of a custom integrated circuit to allow for inclusion in a miniaturized telecommunications handset or the like, although it will be recognized that certain functions of the rake combiner may be performed by general purpose digital processing circuitry where desired.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A combiner circuit for use with a spread-spectrum rake receiver having a plurality of rake receiver fingers providing de-spread symbol data from respective corresponding signal components of a received spread-spectrum multi-path signal, the combiner circuit comprising:

a tap-delay line having a sequence of registers cyclically addressed according to a counter index provided by a counter; and a summation circuit, coupled between said plurality of rake receiver fingers and said tap-delay line, having input terminals adapted to receive de-spread symbol data from respective said plurality of rake receiver fingers by way of output terminals of gates controlled in accordance with correlation between said counter index and a respective de-skew index corresponding to each rake receiver finger, each of said gates having a first input terminal to receive said respective de-skew index and a second input terminal coupled to said counter to receive said counter index and one of said output terminals respectively coupled to one of said input terminals of said summation circuit, wherein each of said gates includes a pass gate and a comparator;

wherein for each of plural index values of the counter index, the summation circuit is operative to sum data content of a tap-delay line register addressed by said counter with the de-spread symbol data from each rake receiver finger having a matching de-skew index, the summation circuit having an output terminal coupled to said addressed tap-delay line to provide a summation result from said summed data content and said de-spread symbol data to be stored in said addressed tap-delay line register, wherein said summation circuit has another input terminal coupled to said addressed tap-delay line register to receive said data content of said tap-delay line register addressed by said counter.

2. The combiner circuit as claimed in claim 1 wherein a number of registers in the tap-delay line sequence is equal to a delay spread of the received spread-spectrum multi-path signal in terms of de-spread symbol durations.

3. The combiner circuit as claimed in claim 1, further comprising, for each rake receiver finger, a de-skew index register stored with a de-skew index and having an output terminal to provide said de-skew index, wherein each of said gates includes, for each rake receiver finger:
said comparator, which has said first input terminal, coupled to said output terminal of the de-skew index register, to receive said de-skew index, and having said second input terminal coupled to said counter to receive said counter index, said comparator being adapted to compare said de-skew index and said counter index; and
said pass gate, which is controlled by an output of the comparator received at an input terminal of said pass gate, and having another input terminal coupled to an output terminal of the rake receiver finger and having said one of said output terminals respectively coupled to said one of said input terminals of said summation circuit.

4. The combiner circuit as claimed in claim 1 wherein the de-skew index corresponding to a particular rake receiver finger is determined based on a path delay of a signal component for that rake receiver finger.

5. The combiner circuit as claimed in claim 1 wherein following each cycle of index values of the counter index, the data contents of the tap-delay line are shifted by one register location in the sequence.

6. A rake receiver for spread-spectrum multi-path signals, comprising:
a plurality of rake receiver fingers to generate de-spread symbol data from respective corresponding signal components of a received spread-spectrum multi-path signal; and
a combiner including a sequence of registers cyclically addressed according to index values of a counter index provided by a counter, and a correlator coupled between the rake receiver fingers and the register sequence to sum data from a register in said sequence addressed by said counter with selected de-spread symbol data from at least one of said rake receiver fingers in accordance with a correlation between said rake receiver fingers and said index values of said counter index, the correlator having a first input terminal coupled to said addressed register to receive said data from said addressed register and having another input terminal coupled to said counter to receive said counter index and having an output terminal coupled to said sequence of registers to provide a result of said summed data and de-spread symbol data to be stored in said addressed register, wherein the correlator includes an adder having said first input terminal coupled to said addressed register to receive said data from said addressed register and having second input terminals coupled to receive de-spread symbol data from respective said rake receiver fingers by way of output terminals of gates controlled in accordance with correlation between said counter index and a respective de-skew index corresponding to each rake receiver finger, each of said gates having said another input terminal coupled to said counter to receive said counter index and still another input terminal to receive said respective de-skew index, wherein each of said gates includes a pass gate and a comparator.

7. The rake receiver as claimed in claim 6 wherein the adder is operative to sum the data of the addressed register in said register sequence with the de-spread symbol data from each rake receiver finger having a de-skew index matching the counter index, for each index value of said counter index.

8. The rake receiver as claimed in claim 7 wherein a number of registers in the register sequence is determined by a delay spread of the received multi-path signal in terms of de-spread symbol durations.

9. The rake receiver as claimed in claim 7, further comprising, for each rake receiver finger, a de-skew index register stored with a de-skew index and having an output terminal to provide said respective de-skew index, wherein, for each rake receiver finger, each of said gates includes:
said comparator, which has said still another input terminal, coupled to said output terminal of the de-skew index register, to receive said respective de-skew index, and having said another input terminal coupled to said counter to receive said counter index, said comparator being adapted to compare said respective de-skew index and said counter index; and
said pass gate circuit, which is controlled by an output of the comparator received at an input terminal of said pass gate, and having another input terminal coupled to an output terminal of the rake receiver finger and having one of said output terminals of said gates coupled to one of said second input terminals of the adder.

10. The rake receiver as claimed in claim 9 wherein the de-skew index corresponding to a particular rake receiver finger is determined based on a path delay of a signal component for that rake receiver finger.

11. The rake receiver as claimed in claim 6 wherein following each cycle of counter indices, data contents of the register sequence are shifted by one register location in the sequence.

12. A method for combining de-spread symbol data generated by a plurality of rake receiver fingers from respective corresponding signal components of a received spread-spectrum multi-path signal, the method comprising:

establishing a sequence of registers;

determining a respective de-skew index for each rake receiver finger;

addressing the registers in the sequence according to a counter index cycle of counter index values from a counter;

comparing a counter index value from said counter with the respective de-skew index for a particular rake receiver finger, and if a counter index value from said counter matches the respective de-skew index for said particular rake receiver finger, summing de-spread symbol data from that rake receiver finger with content of a register in the sequence that is addressed by said counter; and storing a summation result of said summing in the addressed register to overwrite said content of said addressed register, wherein said summing is performed by an adder having a first input terminal coupled to said addressed register to receive said content of said addressed register and having second input terminals coupled to receive de-spread symbol data from respective said rake receiver fingers by way of output terminals of gates controlled in accordance with correlation between said counter index value and said respective de-skew index for each rake receiver finger, each of said gates having said an input terminal coupled to said counter to receive said counter index and another input terminal to receive said respective de-skew index, wherein each of said gates includes a pass gate and a comparator.

13. The method as claimed in claim 12 wherein a number of registers in the register sequence is determined by a delay spread of the received multi-path signal in terms of de-spread symbol durations.

14. The method as claimed in claim 12 wherein the de-skew index corresponding to a particular rake receiver finger is determined based on a path delay of the signal component for that rake receiver finger.

15. The method as claimed in claim 12 wherein following each cycle of counter index values, contents of the register sequence are shifted by one register location in the sequence.

* * * * *